(12) United States Patent
Wu et al.

(10) Patent No.: US 10,882,747 B2
(45) Date of Patent: Jan. 5, 2021

(54) HIGH-STRENGTH NETWORK STRUCTURED NANO-CARRIER MATERIAL AND PREPARATION METHOD AND APPLICATION THEREOF

(71) Applicant: CENTRAL SOUTH UNIVERSITY OF FORESTRY AND TECHNOLOGY, Changsha (CN)

(72) Inventors: Yiqiang Wu, Changsha (CN); Zhen Zhang, Changsha (CN); Yan Qing, Changsha (CN); Qinglin Wu, Changsha (CN); Sha Luo, Changsha (CN); Cuihua Tian, Changsha (CN); Lei Li, Changsha (CN)

(73) Assignee: CENTRAL SOUTH UNIVERSITY OF FORESTRY AND TECHNOLOGY, Changsha (CN)

( * ) Notice: Subject to any disclaimer, the term of this patent is extended or adjusted under 35 U.S.C. 154(b) by 218 days.

(21) Appl. No.: 16/106,579

(22) Filed: Aug. 21, 2018

(65) Prior Publication Data
US 2019/0077667 A1 Mar. 14, 2019

Related U.S. Application Data

(63) Continuation of application No. PCT/CN2018/087478, filed on May 18, 2018.

(30) Foreign Application Priority Data

May 31, 2017 (CN) .......................... 2017 1 0401948

(51) Int. Cl.
*C01B 32/182* (2017.01)
*C08K 3/04* (2006.01)
(Continued)

(52) U.S. Cl.
CPC .......... *C01B 32/182* (2017.08); *C01B 32/194* (2017.08); *C08J 3/2053* (2013.01);
(Continued)

(58) Field of Classification Search
CPC ........ D21H 11/12; D21H 13/08; D21H 21/08; C08J 2201/0484; C08J 2301/02;
(Continued)

(56) References Cited

U.S. PATENT DOCUMENTS

2014/0134415 A1   5/2014   Gong et al.

FOREIGN PATENT DOCUMENTS

| CN | 105566659 A | 5/2016 |
|----|-------------|--------|
| CN | 106517157 A | 3/2017 |

(Continued)

*Primary Examiner* — Camie S Thompson

(57) ABSTRACT

A high-strength network structured nano-carrier material and a preparation method and application thereof. A nano-cellulose solution and graphene are mixed and ultrasonication is performed in an ultrasonic pulverizer to obtain a nano-cellulose/graphene suspension. The suspension with a phenolic resin adhesive is mixed and stirred to obtain a nano-cellulose/graphene/phenolic resin suspension. The nano-cellulose/graphene/phenolic resin suspension is injected into a mold. The mold is placed in a freeze dryer for freezing and vacuum dried in two stages to obtain a nano-cellulose/graphene/phenolic resin aerogel. The aerogel is preheated and cured in a muffle furnace, then subjected to a high-temperature thermal decomposition treatment in a tube furnace to obtain a nano-carrier material having a high-strength network structure. The preparation method is simple and convenient, low in cost, environmentally friendly and green. The obtained carrier material has a good water resistance and a high mechanical property, and can carry more active substances.

16 Claims, 4 Drawing Sheets

(51) Int. Cl.
| | |
|---|---|
| D21H 13/50 | (2006.01) |
| D21H 15/02 | (2006.01) |
| C08J 5/18 | (2006.01) |
| D21H 21/08 | (2006.01) |
| C08J 9/00 | (2006.01) |
| D21H 11/12 | (2006.01) |
| C08J 9/28 | (2006.01) |
| C01B 32/194 | (2017.01) |
| D21H 17/56 | (2006.01) |
| D21H 13/08 | (2006.01) |
| C08J 3/205 | (2006.01) |
| C08L 61/06 | (2006.01) |
| B82Y 40/00 | (2011.01) |

(52) U.S. Cl.
CPC ............... *C08J 5/18* (2013.01); *C08J 9/0061* (2013.01); *C08J 9/0066* (2013.01); *C08J 9/283* (2013.01); *C08K 3/042* (2017.05); *C08L 61/06* (2013.01); *D21H 11/12* (2013.01); *D21H 13/08* (2013.01); *D21H 13/50* (2013.01); *D21H 15/02* (2013.01); *D21H 17/56* (2013.01); *D21H 21/08* (2013.01); *B82Y 40/00* (2013.01); *C01P 2006/10* (2013.01); *C01P 2006/16* (2013.01); *C08J 2201/0484* (2013.01); *C08J 2205/026* (2013.01); *C08J 2205/042* (2013.01); *C08J 2205/044* (2013.01); *C08J 2301/02* (2013.01); *C08J 2361/04* (2013.01); *C08J 2401/02* (2013.01); *C08J 2461/04* (2013.01)

(58) Field of Classification Search
CPC ........ C08J 2401/02; C08J 3/2053; C08J 5/18; C08J 9/0061; C08J 9/0066; C08J 9/282; C08J 2205/042; C08J 2205/044; C01P 2006/10; C01P 2006/16; C01B 32/182; C01B 32/194; B82Y 40/00; C08L 61/06; C08L 1/02; C08K 3/042
USPC .................. 428/221, 292.1, 297.4, 297.7
See application file for complete search history.

(56) References Cited

FOREIGN PATENT DOCUMENTS

| | | |
|---|---|---|
| CN | 106565267 A | 4/2017 |
| CN | 107128895 A | 9/2017 |

HIGH-STRENGTH NETWORK STRUCTURED NANO-CARRIER MATERIAL AND PREPARATION METHOD AND APPLICATION THEREOF

RELATED APPLICATIONS

The present application is a continuation application of the international application PCT/CN2018/087478 filed May 18, 2018, which claims the benefit of the Chinese patent application CN201710401948.1 filed May 31, 2017, each of which is incorporated herein by reference in its entirety.

FIELD OF THE INVENTION

The invention relates to the technical field of nano-materials, in particular to a method for the preparation of a nano-carrier material having a 3D network structure, high mechanical strength and good load effect.

BACKGROUND OF THE INVENTION

Porous network-structured carrier materials have broad application prospects in the fields of load catalysis, capacitors, energy storage devices, etc. Carbon aerogel is widely used in nano-porous carrier materials due to its high specific surface area, high porosity, low density, excellent electrical conductivity and continuous three-dimensional nano-network structure. The most common carbon aerogel materials currently available are organic carbon aerogel such as resorcinol/formaldehyde carbon aerogel, melamine/formaldehyde carbon aerogel, formaldehyde/cresol carbon aerogel, and the like. The preparation method of the organic carbon aerogel mainly comprises a sol-gel method and a hydrothermal method, and an organic carbon aerogel is obtained by subjecting a precursor to polycondensation reaction to synthesize an organic aerogel and then carbonizing under high temperature conditions. These precursors mainly comprise high-cost phenolic organic compounds such as hydroquinone, phloroglucinol, melamine, formaldehyde, furfural and so on, and the synthesis process is complicated and time-consuming when performing the polycondensation reaction. Also, these precursors of carbon aerogel are toxic and expensive. These problems have greatly hindered the large-scale production and application of the organic carbon aerogels in practice.

Therefore, materials such as bacterial cellulose, plant cellulose, animal cellulose, etc. capable of replacing these precursors for preparing carbon aerogels have become research hotspots in the field. However, at present, these nano-cellulosic materials applied to the field of porous network-structured carrier materials have the following problems: (1) nano-cellulose after being processed into carbon material cannot well preserved in an aqueous solution or an organic solution, so that it is difficult for it to become the carrier material of other active materials; (2) the electrochemical property of the nano-cellulose after being processed into carbon material is poor, thus hindering the electrochemical performance thereof after loading the active material; and (3) the mechanical properties of the nano-cellulose after being processed into carbon material are poor, and it is liable to cause the structure to collapse after loading too much active material.

The existing methods for preparing nano-cellulose carbon aerogel materials mainly comprise biological activation method, artificial synthesis method, chemical treatment and physical mechanical treatment.

CN 106517157A discloses a preparation method of nitrogen-doped carbon nano-fiber/graphene aerogel, comprising mixing nano-cellulose with graphene oxide, and preparing a composite hydrogel by a hydrothermal method; and after freezing the composite hydrogel utilizing liquid nitrogen or ultra-low temperature refrigerator, placing it in a vacuum freeze dryer for deicing and drying treatment for 24-48 hours, placing the aerogel after being frozen in a tube furnace and performing high-temperature carbonization treatment at 500-800° C. for 1-3 hours, to obtain the nitrogen-doped carbon nano-fiber/graphene aerogel.

CN 106565267A discloses a preparation method of a carbon aerogel composite material, comprising preparing a graphene oxide aerogel phenolic resin precursor solution, and preparing the precursor solution into a graphene oxide-phenolic resin wet gel; subjecting the graphene oxide-phenolic resin wet gel to moisture replacement and drying to obtain a graphene oxide-phenolic resin aerogel; and heat treating the graphene oxide-phenolic resin aerogel to allow simultaneous reduction of the graphene oxide aerogel in the graphene oxide-phenolic resin aerogel and carbonization of the phenolic resin aerogel in the graphene oxide-phenolic resin aerogel, so as to obtain a graphene in-situ doped aerogel; and activating the graphene in-situ doped aerogel to obtain the carbon aerogel composite.

However, after the nano-cellulose obtained by these methods is processed into carbon material, the interior is an interconnected three-dimensional network structure and the skeleton is a cellulose carbon material having a smaller diameter, and when placed in an aqueous solution or an organic solution, these carbon materials have their structures unstable and are easy to disperse, so that other active materials such as graphene cannot be well loaded on the carbon material and are easy to disperse in the solution along with the carrier material. Some of the existing carbon aerogel materials themselves prepared from nano-cellulose have low capacitance and slightly high electrical resistance, and the carbon materials formed by compounding with other active materials have a higher electrical resistance, thereby hindering the electrochemical performance of the overall material. The existing nano-cellulose carbon aerogel material cannot be well preserved in an aqueous solution or an organic solution, so when compounding with a metal oxide or a high molecular weight polymer having a high specific capacitance by a hydrothermal treatment or the like, they cannot uniformly grow on the carbon material, thereby influencing the improvement of the electrochemical performance.

In order to enhance the mechanical strength of resorcinol-furfural carbon aerogel, it has been reported in a literature to strengthen the composite of carbon aerogel by changing the amount of the catalyst hexamethylenetetramine. However, the above-mentioned solution for strengthening carbon aerogel is too limited to be universally applicable to most carbon aerogels, such as bacterial cellulose carbon aerogels and lignocellulosic carbon aerogels.

Therefore, the development of a high-strength network structured nano-carrier material is of great significance for the efficient utilization of carrier materials.

OBJECTS AND SUMMARY OF THE INVENTION

The object of the present invention is to overcome the above defects and deficiencies, and to provide a nanocellulose-based porous carrier material having a 3D network structure, a high mechanical strength and good load effect, a preparation method and application thereof, and the preparation method has the advantages of simple and convenient operation and relatively low cost, and improves the application value and application field of the porous carrier materials.

In order to solve the above technical problems, the present invention provides the following technical solution.

A method for preparing a high-strength network structured nano-carrier material, characterized in that, the method comprises the steps of:

(1) mixing a nano-cellulose solution with graphene, and then performing ultrasonication in an ultrasonic pulverizer for 3-10 minutes to obtain a uniformly mixed nano-cellulose/graphene suspension;

(2) mixing the nano-cellulose/graphene suspension obtained in step (1) with a phenolic resin adhesive and then stirring at a stirring speed of 80-400 rpm for 10-30 minutes to obtain a nano-cellulose/graphene/phenolic resin suspension;

(3) injecting the nano-cellulose/graphene/phenolic resin suspension obtained in step (2) into a mold and placing in a freeze dryer for freezing at a freezing temperature of −40 to -60° C. for 8-15 hours, vacuum drying at −40 to -60° C. for 5-8 hours, then vacuum drying at 10-40° C. for 10-14 hours, and demolding to obtain a nano-cellulose/graphene/phenolic resin aerogel;

(4) preheating and curing the nano-cellulose/graphene/phenolic resin aerogel obtained in step (3) in a muffle furnace for 10-30 minutes to completely cure the phenolic resin in the aerogel; and (5) subjecting the preheated and cured nano-cellulose/graphene/phenolic resin aerogel obtained in step (4) to high-temperature thermal decomposition treatment in a tube furnace to carbonize the nano-cellulose and phenolic resin, and obtaining the nano-carrier material with a high-strength network structure after the carbonization is finished.

Nano-cellulose is a natural, reproducible and richest polymer with strong reproducibility and excellent biodegradability, high specific surface area and good dispersibility. Graphene is a new type of nano-material with the advantages of thinness, high strength, good electrical and thermal conductivity, etc., and is of great research value. After the graphene and the nano-cellulose solution are mixed, the graphene excellent in electrical conductivity can be well dispersed on and adhered to the nano-cellulose by ultrasonic pulverization. The water-soluble phenolic resin is easily soluble in an aqueous solution. Therefore, a phenolic resin is added into a nano-cellulose/graphene mixed suspension and thoroughly stirred until the phenolic resin is completely dissolved in the mixed suspension, at which time the phenolic resin is linked with the nano-cellulose through hydrogen bonds, and the graphene is enveloped therebetween to obtain a nano-cellulose/graphene/phenolic resin suspension. The obtained suspension is subjected to low-temperature freezing treatment to allow the phenolic resin-coated nano-cellulose/graphene to form a stable network skeleton structure. The ice crystals therein are then discharged by sublimation via vacuum drying to obtain a nano-cellulose/graphene/phenolic resin aerogel. The nano-cellulose/graphene/phenolic resin aerogel is firstly preheated and cured in a muffle furnace, and finally thermally decomposed in a tube furnace at a high temperature, and the phenolic resin is carbonized into a glassy carbon structure to be coated on the nano-cellulose, thus obtaining a nano-cellulose-based active material carrier material having high mechanical properties, excellent loading effect, and porosity.

Further, in the step (1), the solid content of the nano-cellulose solution is preferably 0.4-0.6%. The preparation process of the nano-cellulose solution comprises the steps of: adding a wood cellulose powder into concentrated sulfuric acid with a mass fraction of 40-60% at a solid-to-liquid ratio of 1:(18-22), and stirring in a water bath at 40-50° C. for 1-3 hours until the cellulose hydrolysis process is finished, then adjusting the pH value to 6-7 with ultrapure water, and then obtaining a uniformly dispersed nano-cellulose solution by high pressure homogenization treatment for 15-25 cycles.

Further, in the step (1), the nano-cellulose solution is mixed with graphene at the mass ratio of nano-cellulose to graphene of 1:1 to 10:1. If the mass ratio is lower than 1:1, a large part of graphene would not be loaded on the nano-cellulose, and at the same time it will also affect the uniform dispersion of graphene; and if the mass ratio is higher than 10:1, only a small amount of graphene would be loaded on the nano-cellulose, and the finally resulting carrier material would have worse conductivity.

Further, in the step (2), the nano-cellulose/graphene suspension obtained in the step (1) is mixed with the phenolic resin adhesive at the mass ratio of the nano-cellulose to the phenolic resin of 2:1 to 2:15. If the mass ratio is lower than 2:1, the phenolic resin cannot coat the graphene onto the nano-cellulose well; and if the mass ratio is higher than 2:15, the phenolic resin would be non-uniformly dispersed, thus would affect the formation of a network structure.

Further, in the step (4), the preheating and curing temperature is preferably 100-150° C., with the purpose of sufficiently discharging the moisture in the phenolic resin to stably coat the phenolic resin on the nano-cellulose. If the temperature is too low, the phenolic resin cannot be well fixed on the cellulose; and if the temperature is too high, the nano-cellulose will oxidize and decompose to cause the structure to collapse.

Further, in the step (5), the carbonization temperature is preferably 800-1200° C. In this temperature range, the nano-cellulose and the phenolic resin would be thermally decomposed into carbon material, thereby obtaining an active material carrier material having good electrical conductivity, excellent mechanical properties, stable loading effect and porosity. If the carbonization temperature is lower than this temperature range, the obtained carrier material cannot be completely carbonized, thereby causing the conductivity to become worse; and if the carbonization temperature is higher than this temperature range, the nano-cellulose and the phenolic resin would be graphitized, and the network structure is liable to collapse.

The invention also provides a high-strength network structured nano-carrier material prepared by the above method, wherein the high-strength network structured nano-carrier material has a density of 3.05-3.70 g/m$^2$ and a pore diameter of 0.02-5 μm.

By using the preparation method of the high-strength network structured nano-carrier material according to the present invention, a three-dimensional network structured carrier material with high porosity, porosity and cellulose interlacement, and the material as a whole has a porous structure and has many mesopores. The active material can be better and more adhered onto the mesopores than onto micropores and macropores.

The high-strength network structured nano-carrier material provided according to the invention has a maximum bearing force of 35-55N. The high-strength network structured nano-carrier material provided according to the invention has a compressive strength of 50-75 Pa.

The invention also provides application of the high-strength network structured nano-carrier material in load catalysis, capacitors and energy storage devices.

Compared with the prior art, the invention has the following advantages: the high-strength network structured nano-carrier material of the invention has better water resistance, can be completely stored in an aqueous solution for a long time, and can maintain its original three-dimensional network structure and have its morphological structure undamaged after being taken out from the aqueous solution and dried. Under a pressure several hundred times heavier than itself, the carrier material can still maintain a good morphology with only slight compression deformation phenomenon, so that the carrier material can load the active material under a high pressure, and can carry more active materials without affecting the structure thereof. The preparation method of the invention has the advantages of simple operation, strong controllability, a wide source of the raw material plant fibers and a low cost and conforms to the strategic goal of green sustainable development.

BRIEF DESCRIPTION OF FIGURES

In order to more clearly illustrate the embodiments of the present invention or the technical solutions in the prior art, the drawings required in the embodiments or the description of the prior art will be briefly described below. Obviously, the drawings in the following description are some embodiments of the present invention, and for a person skilled in the art, other figures can also be obtained based on these drawings without paying creative efforts.

DETAILED DESCRIPTION OF THE EMBODIMENTS

Figure 1:
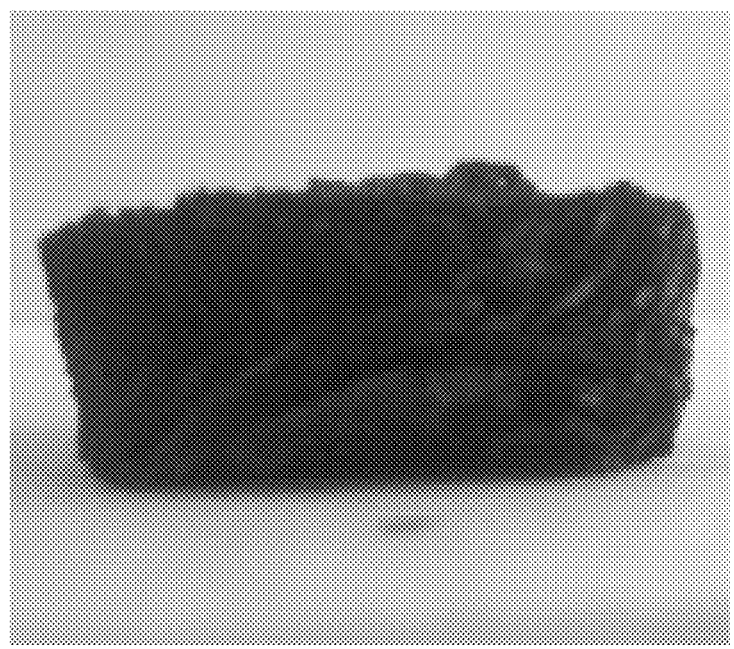
FIG. 1 is a physical diagram of a high-strength network structured nano-carrier obtained in Example 1 of the present invention.

In order to facilitate understanding of the present invention, the invention will be described more fully and in detail below with reference to the accompanying drawings and preferred embodiments. However, the protection scope of the invention is not limited to the following specific embodiments.

Unless otherwise defined, all technical terms used hereinafter have the same meaning as commonly understood by a person skilled in the art. The technical terms used herein is only for the purpose of describing the particular embodiments, but is not intended to limit the protection scope of the invention.

Unless otherwise specified, various raw materials, reagents, instruments, equipment and the like used in the present invention are commercially available or can be prepared by an existing method.

EXAMPLE 1

This example is for preparing the high-strength network structured nano-carrier material of the present invention. The specific preparation steps of the high-strength network structured nano-carrier material are as follows:

The first step: adding a wood cellulose powder into concentrated sulfuric acid with a mass fraction of 48% at a solid-to-liquid ratio of 1:20, and stirring in a water bath at 45° C. for 2 h so as to hydrolyze the cellulose, then adjusting the pH value to 6-7 with ultrapure water, and obtaining a uniformly dispersed nano-cellulose solution by high-pressure homogenization treatment for 15-25 cycles.

The second step: mixing the nano-cellulose solution obtained in the first step with graphene at the mass ratio of the cellulose to graphene of 1:1, and then performing ultrasonication in an ultrasonic pulverizer for 3 min to obtain a uniformly mixed nano-cellulose/graphene suspension.

The third step: mixing the nano-cellulose/graphene suspension obtained in the second step with a phenolic resin adhesive at a mass ratio of 2:1, and then stirring at a stirring speed of 100 rpm for 10 minutes, and obtaining a nano-cellulose/graphene/phenolic resin suspension after stirring uniformly.

The fourth step: injecting the nano-cellulose/graphene/phenolic resin suspension obtained in the third step into a mold and freezing in a freeze dryer at −40° C. for 15 hours, then vacuum drying at −40° C. for 5 hours, finally vacuum drying at about 20° C. for 12 hours, and demolding to obtain a nano-cellulose/graphene/phenolic resin aerogel.

The fifth step: preheating and curing the nano-cellulose/graphene/phenolic resin aerogel obtained in the fourth step in a muffle furnace for 30 minutes at a preheating and curing temperature of 100° C., so as to completely cure the phenolic resin in the aerogel.

The sixth step: subjecting the nano-cellulose/graphene/phenolic resin aerogel obtained in the fifth step to high-temperature thermal decomposition treatment in a tube furnace at a thermal decomposition treatment temperature of 800° C. to perform carbonization, and obtaining the high-strength network structured nano-carrier material after the carbonization is finished.

Figure 2:
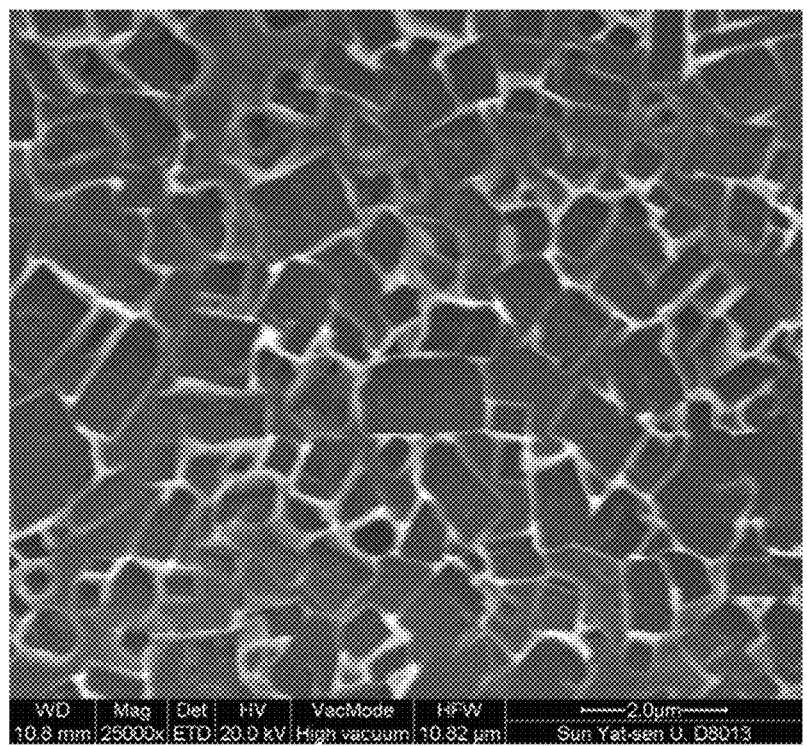
FIG. 2 is a microscopic electron micrograph of a high-strength network structured nano-carrier obtained in Example 1 of the present invention.

The physical diagram of the obtained high-strength network structured nano-carrier is as shown in FIG. 1. The microstructure of the high-strength network structured nano-carrier material is as shown in FIG. 2. The maximum bearing force and compressive strength of the carrier material are tested using the Universal Mechanical Testing Machine (Model MWD-50) of Jinan Shijin Group Co., Ltd. The test results are shown in Table 1.

EXAMPLE 2

An example of a preparation method of a high-strength network structured nano-carrier material of the present invention. The specific preparation steps of the high-strength network structured nano-carrier material are as follows:

The first step: adding a wood cellulose powder into concentrated sulfuric acid with a mass fraction of 48% at a solid-to-liquid ratio of 1:20, and stirring in a water bath at 45° C. for 2 hours so as to hydrolyze the cellulose, then adjusting the pH value to 6-7 with ultrapure water, and obtaining a uniformly dispersed nano-cellulose solution by high-pressure homogenization treatment for 15-25 cycles.

The second step: mixing the nano-cellulose solution obtained in the first step with graphene at the mass ratio of the cellulose to graphene of 5:1, and then performing ultrasonication in an ultrasonic pulverizer for 5 min to obtain a uniformly mixed nano-cellulose/graphene suspension.

The third step: mixing the nano-cellulose/graphene suspension obtained in the second step with a phenolic resin adhesive at a mass ratio of 2:5, and then stirring at a stirring speed of 200 rpm for 20 minutes, and obtaining a nano-cellulose/graphene/phenolic resin suspension after stirring uniformly.

The fourth step: injecting the nano-cellulose/graphene/phenolic resin suspension obtained in the third step into a mold and freezing in a freeze dryer at −50° C. for 10 hours, then vacuum drying at −40° C. for 7 hours, finally vacuum drying at about 30° C. for 12 hours, and demolding to obtain a nano-cellulose/graphene/phenolic resin aerogel.

The fifth step: preheating and curing the nano-cellulose/graphene/phenolic resin aerogel obtained in the fourth step in a muffle furnace for 20 minutes at a preheating and curing temperature of 130° C., so as to completely cure the phenolic resin in the aerogel.

The sixth step: subjecting the nano-cellulose/graphene/phenolic resin aerogel obtained in the fifth step to high-temperature thermal decomposition treatment in a tube furnace at a thermal decomposition treatment temperature of 900° C. to perform carbonization, and obtaining the high-strength network structured nano-carrier material after the carbonization is finished.

Figure 3:
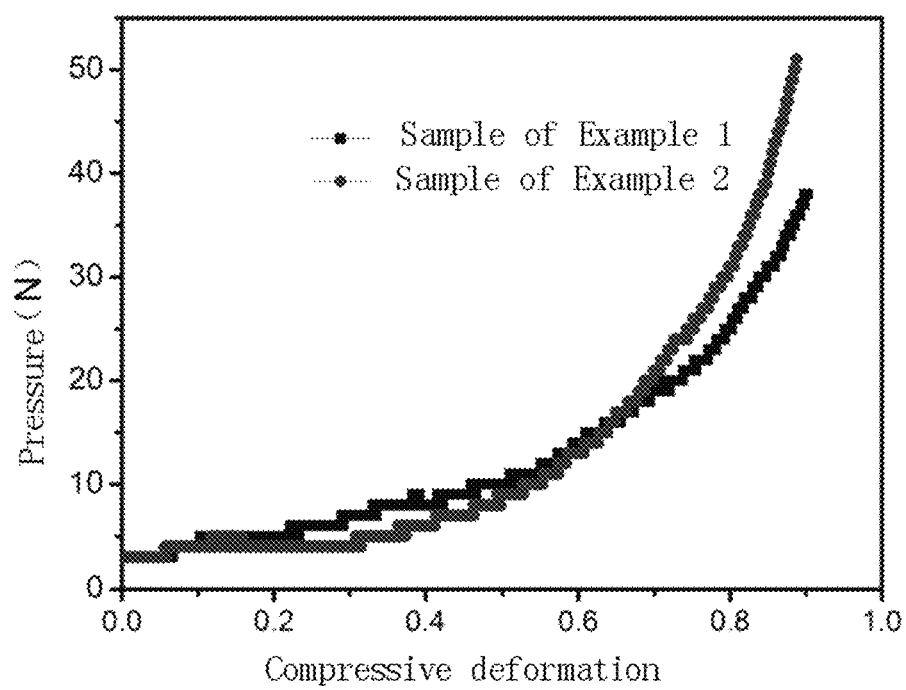
FIG. 3 shows a pressure deformation contrast curve of the high-strength network structured nano-carriers obtained in Example 1 and Example 2 of the present invention.

The physical diagram of the high-strength network structured nano-carrier obtained in the Example is similar to that obtained in Example 1. The pressure deformation contrast curve of the nano-carrier materials obtained in this Example and in Example 1 is as shown in FIG. 3. The maximum bearing force and compressive strength of the carrier material are tested using the Universal Mechanical Testing Machine (Model MWD-50) of Jinan Shijin Group Co., Ltd. The test results are shown in Table 1.

EXAMPLE 3

An example of a preparation method of a high-strength network structured nano-carrier material of the present invention. The specific preparation steps of the high-strength network structured nano-carrier material are as follows:

The first step: adding a wood cellulose powder into concentrated sulfuric acid with a mass fraction of 48% at a solid-to-liquid ratio of 1:20, and stirring in a water bath at 45° C. for 2 hours so as to hydrolyze the cellulose, then adjusting the pH value to 6-7 with ultrapure water, and obtaining a uniformly dispersed nano-cellulose solution by high-pressure homogenization treatment for 15-25 cycles.

The second step: mixing the nano-cellulose solution obtained in the first step with graphene at the mass ratio of the cellulose to graphene of 10:1, and then performing ultrasonication in an ultrasonic pulverizer for 10 min to obtain a uniformly mixed nano-cellulose/graphene suspension.

The third step: mixing the nano-cellulose/graphene suspension obtained in the second step with a phenolic resin adhesive at a mass ratio of 2:15, and then stirring at a stirring speed of 300 rpm for 30 minutes, and obtaining a nano-cellulose/graphene/phenolic resin suspension after stirring uniformly.

The fourth step: injecting the nano-cellulose/graphene/phenolic resin suspension obtained in the third step into a mold and freezing in a freeze dryer at −60° C. for 8 hours, then vacuum drying at −40° C. for 8 hours, finally vacuum drying at about 40° C. for 12 hours, and demolding to obtain a nano-cellulose/graphene/phenolic resin aerogel.

The fifth step: preheating and curing the nano-cellulose/graphene/phenolic resin aerogel obtained in the fourth step in a muffle furnace for 10 min at a preheating and curing temperature of 150° C., so as to completely cure the phenolic resin in the aerogel.

The sixth step: subjecting the nano-cellulose/graphene/phenolic resin aerogel obtained in the fifth step to high-temperature thermal decomposition treatment in a tube furnace at a thermal decomposition treatment temperature of 1000° C. to perform carbonization, and obtaining the high-strength network structured nano-carrier material after the carbonization is finished.

The physical diagram of the high-strength network structured nano-carrier obtained in this Example is similar to that obtained in Example 1. The maximum bearing force and compressive strength of the carrier material are tested using the Universal Mechanical Testing Machine (Model MWD-50) of Jinan Shijin Group Co., Ltd. The test results are shown in Table 1.

TABLE 1

Mechanical properties of the high-strength network structured nano-carrier materials obtained in Examples 1-3

| Test items | Example 1 | Example 2 | Example 3 |
|---|---|---|---|
| Maximum bearing force (N) | 38 | 51 | 47 |
| Compressive strength (Pa) | 54 | 72 | 62 |

It can be seen from Table 1 that the nano-carrier material prepared by the method of the present invention has a good mechanical strength.

Figure 4:
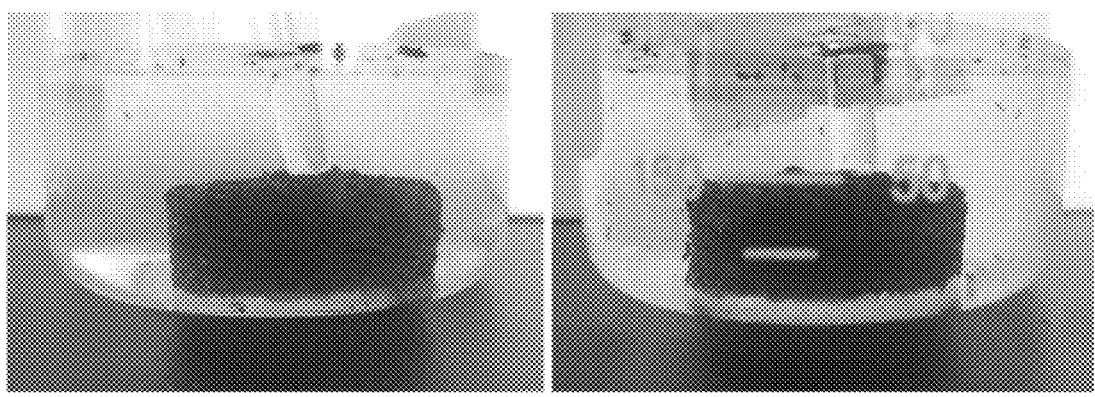
FIG. 4 is a state diagram of the high-strength network structured nano-carrier obtained in Example 3 of the present invention in water (left) and anhydrous ethanol (right), respectively.

The carrier material prepared in Example 4 was immersed in water and ethanol respectively, and kept in a 150° C. high pressure hydrothermal reactor for 12 hours. The state diagrams of the carrier material in water (left) and anhydrous ethanol (right) are shown in FIG. 4. It can be seen from FIG. 4 that it can be integrally preserved in water and ethanol, and has a good water resistance. After the same hydrothermal treatment, the existing nano-cellulose-carbon aerogel material has a volume shrinkage of above 70% and shows an obviously damaged structure.

The above description is only the preferred embodiment of the present invention, but is not intended to limit the present invention. Various modifications and changes can be made to the present invention for a person skilled in the art. Any modifications, equivalent substitutions, improvements, etc. made within the spirit and principle of the present invention should be encompassed within the protection scope of the present invention.

The invention claimed is:

1. A method for preparing a high-strength network structured nano-carrier material, comprising steps of:
mixing a nano-cellulose solution which includes wood cellulose with graphene, and then performing ultrasonication in an ultrasonic pulverizer for 3-10 minutes to obtain a uniformly mixed nano-cellulose/graphene suspension;
mixing the nano-cellulose/graphene suspension with a phenolic resin adhesive and then stirring at a stirring speed of 80-400 rpm for 10-30 minutes to obtain a nano-cellulose/graphene/phenolic resin suspension;
injecting the nano-cellulose/graphene/phenolic resin suspension into a mold, freezing the nano-cellulose/graphene/phenolic resin suspension at a freezing temperature of −40° C. to −60° C. for 8-15 hours in a freeze dryer, vacuum drying the nano-cellulose/graphene/phenolic resin suspension at −40° C. to −60° C. for 5-8 hours, then vacuum drying the nano-cellulose/graphene/phenolic resin suspension at 10-40° C. for 10-14 hours, and demolding to obtain a nano-cellulose/graphene/phenolic resin aerogel;

preheating and curing the nano-cellulose/graphene/phenolic resin aerogel in a muffle furnace for 10-30 minutes to completely cure the phenolic resin in the aerogel; and subjecting the preheated and cured nano-cellulose/graphene/phenolic resin aerogel to a high-temperature thermal decomposition treatment of 800-1200° C. in a tube furnace to carbonize the nano-cellulose and phenolic resin and to obtain a nano-carrier material with a high-strength network structure after the carbonization is completed.

2. The method of claim 1, wherein the nano-cellulose solution is prepared by:

adding a wood cellulose powder into concentrated sulfuric acid with a mass fraction of 40-60% at a solid-to-liquid ratio of 1:(18-22);

stirring in a water bath at 40-50° C. for 1-3 hour so as to hydrolyze the cellulose;

adjusting a pH value to 6-7 with ultrapure water; and obtaining a uniformly dispersed nano-cellulose solution by a high-pressure homogenization treatment for 15-25 cycles.

3. The method of claim 1, wherein the nano-cellulose solution has a solid content of 0.4% to 0.6%.

4. The method of claim 1, wherein the nano-cellulose solution is mixed with graphene at a mass ratio of the nano-cellulose to graphene of 1:1 to 10:1.

5. The method of claim 1, wherein the nano-cellulose/graphene suspension is mixed with the phenolic resin adhesive at the mass ratio of the nano-cellulose to the phenolic resin adhesive of 2:1-2:15.

6. The method of claim 1, wherein the preheating and curing temperature is 100-150° C.

7. A high-strength network structured nano-carrier material having a density of 3.05-3.70 g/m2 and a pore diameter of 0.02-5 μm; and wherein the high-strength network structured nano-carrier material is obtained by:

mixing a nano-cellulose solution with graphene, and then performing ultrasonication in a ultrasonic pulverizer for 3-10 minutes to obtain a uniformly mixed nano-cellulose/graphene suspension;

mixing the nano-cellulose/graphene suspension with a phenolic resin adhesive and then stirring at a stirring speed of 80-400 rpm for 10-30 minutes to obtain a nano-cellulose/graphene/phenolic resin suspension;

injecting the nano-cellulose/graphene/phenolic resin suspension into a mold, freezing the nano-cellulose/graphene/phenolic resin suspension at a freezing temperature of −40° C. to −60° C. for 8-15 hours in a freeze dryer, vacuum drying the nano-cellulose/graphene/phenolic resin suspension at −40° C. to −60° C. for 5-8 hours, then vacuum drying the nano-cellulose/graphene/phenolic resin suspension at 10-40° C. for 10-14 hours, and demolding to obtain a nano-cellulose/graphene/phenolic resin aerogel;

preheating and curing the nano-cellulose/graphene/phenolic resin aerogel in a muffle furnace for 10-30 minutes to completely cure the phenolic resin in the aerogel; and subjecting the preheated and cured nano-cellulose/graphene/phenolic resin aerogel to a high-temperature thermal decomposition treatment in a tube furnace to carbonize the nano-cellulose and phenolic resin and to obtain a nano-carrier material with a high-strength network structure after the carbonization is completed.

8. The high-strength network structured nano-carrier material of claim 7 having a maximum bearing force of 35-55 N.

9. The high-strength network structured nano-carrier material of claim 7 having a compressive strength of 50-75 Pa.

10. The high-strength network structured nano-carrier material of claim 7 is configured to undergo no obvious change in a morphological structure after being immersed in water and maintained in a 150° C. high-pressure hydrothermal reactor for 12 hours.

11. The high-strength network structured nano-carrier material of claim 7 is configured to undergo no obvious change in a morphological structure after being immersed in an ethanol and maintained in a 150° C. high-pressure hydrothermal reactor for 12 hours.

12. A method for using a high-strength network structured nano-carrier material of claim 7 in a load catalysis, a capacitor or an energy storage device.

13. The method of claim 12, wherein the high-strength network structured nano-carrier material has a maximum bearing force of 35-55 N.

14. The method in claim 12, wherein the high-strength network structured nano-carrier material has a compressive strength of 50-75 Pa.

15. The method of claim 12, wherein the high-strength network structured nano-carrier material immersed in water and maintained in a 150° C. high-pressure hydrothermal reactor for 12 hours undergoes no obvious change in a morphological structure.

16. The method of claim 12, wherein the high-strength network structured nano-carrier material immersed in an ethanol and maintained in a 150° C. high-pressure hydrothermal reactor for 12 hours undergoes no obvious change in a morphological structure.

\* \* \* \* \*